United States Patent [19]

Severinsson et al.

[11] 4,418,801

[45] Dec. 6, 1983

[54] RAIL VEHICLE SLACK ADJUSTER

[75] Inventors: Lars M. Severinsson, Hishult; Peter Beijbom, Lund; Anders K. Martensson, Bjårred, all of Sweden

[73] Assignee: SAB Industri AB, Landskrona, Sweden

[21] Appl. No.: 272,181

[22] Filed: Jun. 10, 1981

[30] Foreign Application Priority Data

Jun. 24, 1980 [SE] Sweden .............................. 8004670

[51] Int. Cl.³ ............................................ F16D 65/66
[52] U.S. Cl. .................................................... 188/202
[58] Field of Search ............... 188/196 R, 196 D, 199, 188/202, 203

[56] References Cited

U.S. PATENT DOCUMENTS 3,285,375 11/1966 Jeppsson et al. ............... 188/196 D Primary Examiner—Duane A. Reger
Attorney, Agent, or Firm—Laurence R. Brown

[57] ABSTRACT

A rail vehicle slack adjuster of the axial type has a barrel (4), a spindle (2), and an adjuster nut (29).

In order to prevent the spindle (2) from leaving its thread engagement with the adjuster nut (29) the spindle is provided with a stop ring (64) so located that it will contact a barrel part (57) and, via the barrel and a barrel spring (53), bring about a closing of a main clutch (49, 50) between a pull means (6, 48) and the adjuster nut.

1 Claim, 11 Drawing Figures

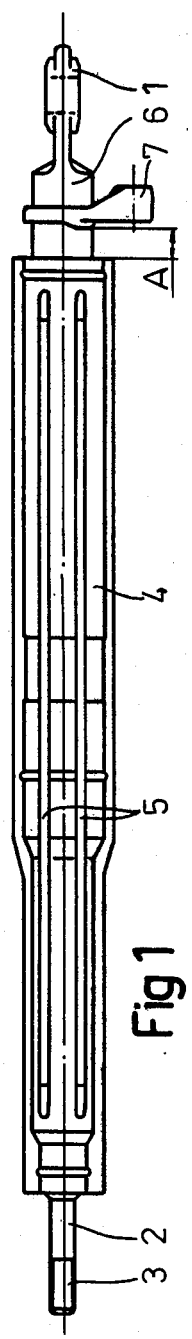
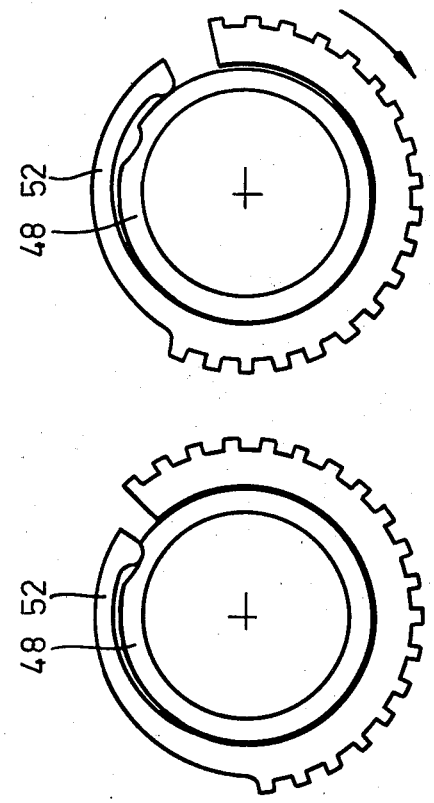
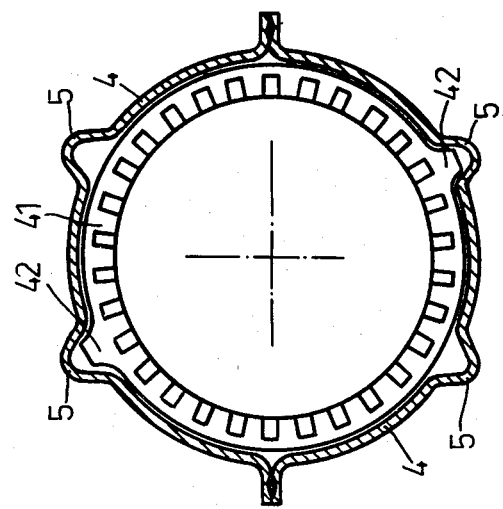

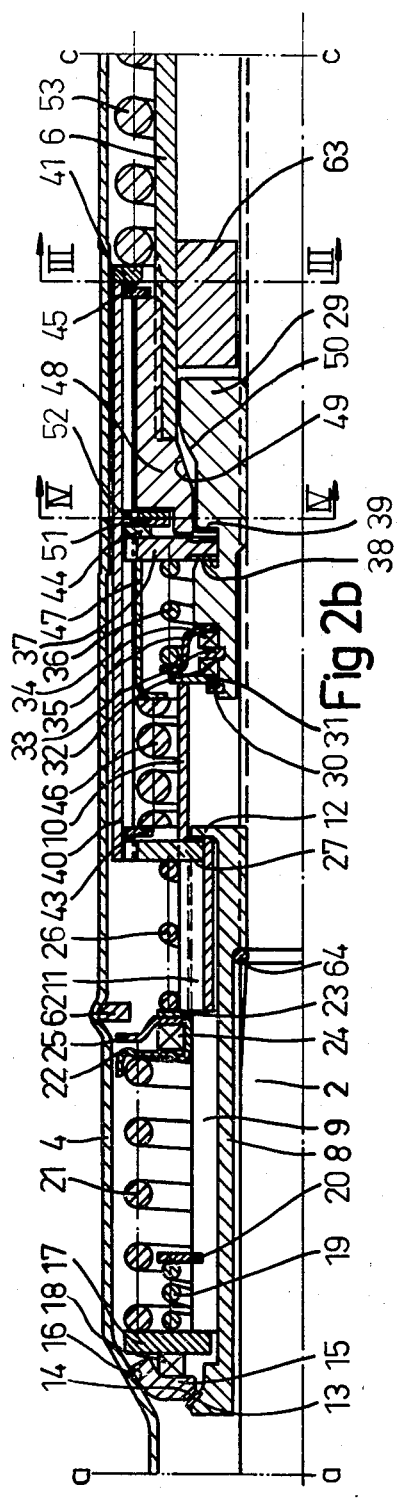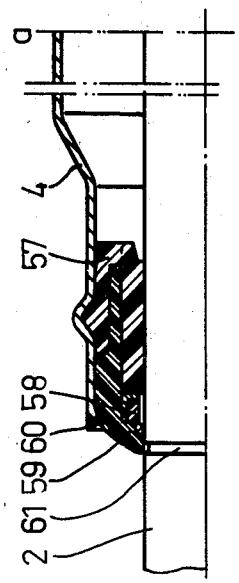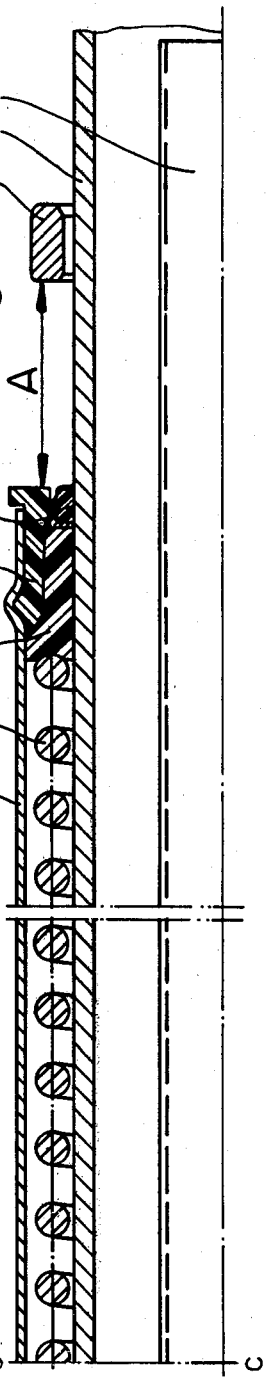

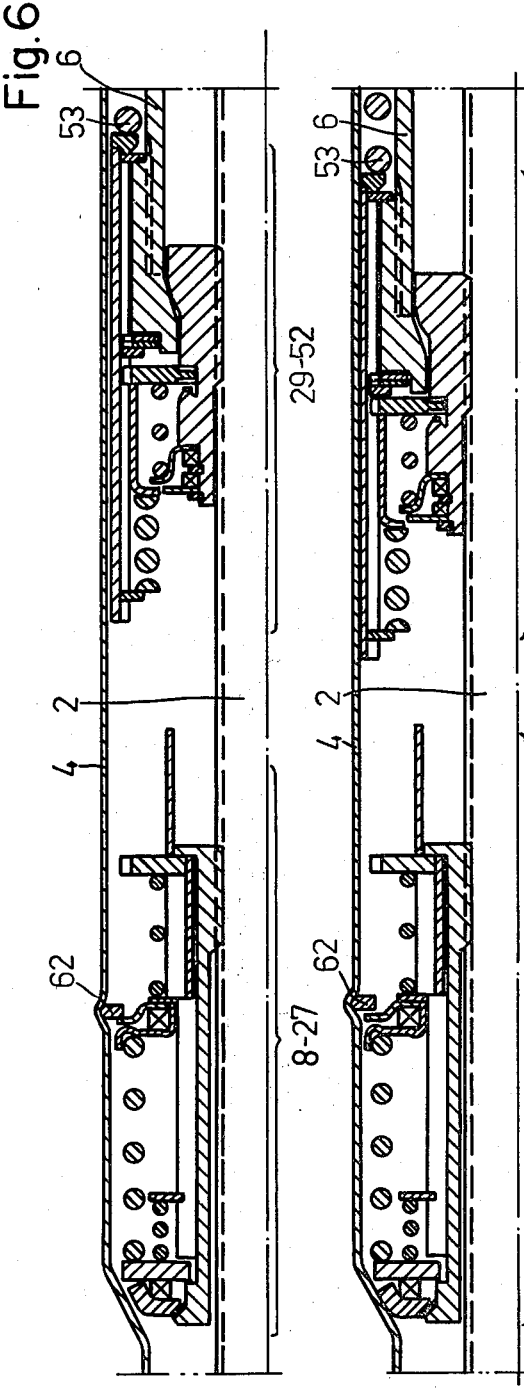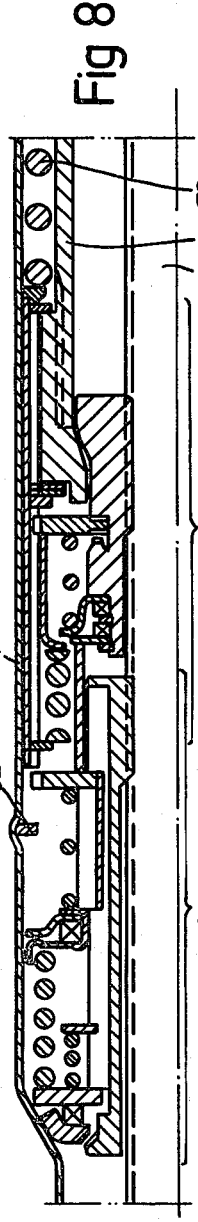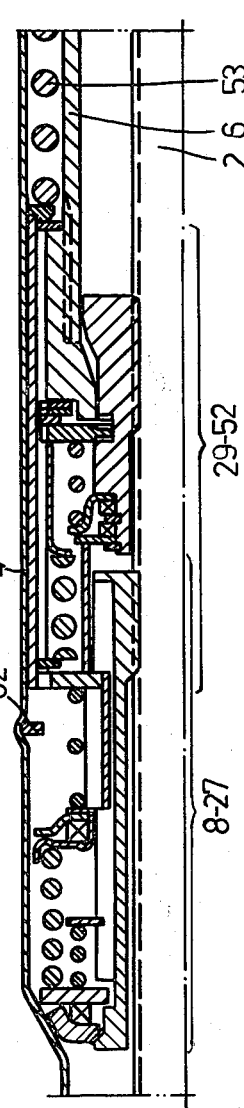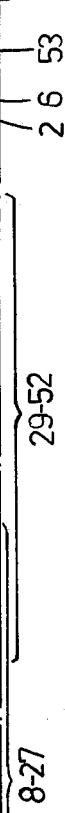

RAIL VEHICLE SLACK ADJUSTER

TECHNICAL FIELD

This invention relates to a rail vehicle slack adjuster of the axial type, comprising an elongated barrel, a non-rotatable pull means extending out of the barrel from one of its ends, a non-rotatable spindle extending out of the barrel from its opposite end, a barrel spring of the helical compression type acting between the barrel and the pull means, and an adjuster nut in non-self-locking engagement with the spindle and capable of being clutched to the pull means.

BACKGROUND ART

A slack adjuster of this kind is mounted as a brake force transmitting rod part in the vehicle brake rigging, and its force-transmitting function is of course absolutely imperative. For this reason it is necessary to see to it that the spindle does not leave its force-transmitting engagement with the adjuster nut at a maximum prolongation of the adjuster. Normally, and as for example shown in U.S. Pat. No. 3,285,375, a cylindrical stop member is attached at the end of the spindle inside the adjuster for preventing the spindle from leaving the adjuster nut.

This arrangement has the detrimental drawback that, when the stop member is in contact with the adjuster nut, the threads of the nut and/or the spindle may be damaged or destroyed at a brake application. Further normal function of the adjuster may thus be disturbed or even made impossible.

THE INVENTION

A far better solution without said drawback is according to the invention attained in that the spindle is provided with a stop ring so located that at a prolongation of the adjuster the stop ring will force-transmittingly contact a part of the barrel with the spindle still in thread engagement in the adjuster nut.

When the stop ring has contacted the barrel part a further spindle movement out of the adjuster results in a force in the same direction on the barrel and the barrel spring, which will be compressed, until a main clutch between the pull means and the adjuster nut will be closed preventing any further spindle movement. The force will thus then be transmitted via the adjuster nut threads and not the stop ring on the spindle.

BRIEF DESCRIPTION OF THE DRAWINGS

The invention will be described in further detail below reference being made to the accompanying drawings, in which FIG. 1 is a side view of a rail vehicle slack adjuster according to the invention, FIG. 2 is a section through the slack adjuster to a larger scale, where FIGS. 2a, 2b and 2c are to be combined along the lines a—a and c—c respectively, FIG. 3 is a section through the adjuster substantially along the line III—III in FIG. 2b but with some parts omitted for the sake of clarity, FIGS. 4 and 5 are sections in different working positions substantially along the line IV—IV in FIG. 2b but with some parts omitted, and FIGS. 6-9 are section views corresponding to FIG. 2 but to a reduced scale and showing the adjuster in different working positions as will be apparent from the description below; reference numerals are omitted in FIGS. 6-9 for the sake of clarity.

DETAILED DESCRIPTION OF A PREFERRED EMBODIMENT

A double-acting, clearance-sensing slack adjuster according to the invention is of the normal so called pulling type and is to be mounted as a pull rod member in a brake rigging of a rail vehicle in a way well known to any person with ordinary skill in the art. Thus, an adjuster ear 1 is to be connected to a not shown member, preferably a brake lever, exerting a pulling force, i.e. a force to the right as viewed in FIG. 1, on the adjuster ear 1. At the other end of the adjuster a spindle 2 (to be further described below) is to be attached (for example by means of a threaded portion 3) to a further not shown member of the brake rigging for transmission of the pulling brake force to a braking part.

DESIGN

The slack adjusting mechanism to be described below is contained in a barrel-type housing, in the shown case consisting of two barrel halves 4. These two halves, made of sheet metal, are connected together, preferably welded, along radial brims and are below collectively referred to as "a barrel 4". The barrel is provided with longitudinal ridges 5 with the primary functions to stiffen the barrel and to protect the cylindrical part thereof against strokes and impacts but also another function to be described below.

Turning now more specifically to the slack adjusting mechanism shown in FIGS. 2a–c (and some details in FIGS. 3-5) the spindle 2 extends a major length of the adjuster and is provided with a non-self-locking thread. The adjuster ear 1 is, as shown in FIG. 1, attached to a tubular pull rod 6 extending into the adjuster. A pull rod head 7 is slidably arranged on the end of the pull rod 6 extending out of the barrel 4. As is well known in the art, this head 7 is to be attached to a reference point for the brake rigging on the rail vehicle, and a distance A between the end of the barrel 4 and the head 7 in the rest position of the brake rigging and the adjuster is called the control distance.

A leader nut 8 is in non-self-locking thread engagement with the spindle 2. The nut 8 is provided with axial ridges 9 with the purpose to strengthen the nut and to give axial guiding for a telescope sleeve 10, which thus is axially movable on the ridges 9 but has axial indentations 11 therebetween so as to prevent any rotational movement thereof. A shoulder 12 on the leader nut 8 provides an axial stop for the sleeve 10 to the right in FIG. 2b.

The leader nut 8 is towards its left hand end in FIG. 2b provided with a preferably serrated clutch surface 13 for cooperation with a corresponding clutch surface 14 on a clutch ring 15. This clutch 13, 14 is thus preferably of the tooth clutch type, whereas a clutch 16 between the clutch ring 15 and the barrel 4 is of the normal cone clutch type.

The clutch ring 15 is backed by a clutch washer 17 via a thrust bearing 18. The clutch washer 17 is axially movable to a limited extent relative to the leader nut 8, and as shown in FIG. 2b it bears against an abutment on the nut 8 in the form of the end of the ridges 9.

A leader nut spring 19 of the helical compression type is arranged between the clutch washer 17 and a fixed support washer 20 in the ridges 9 of the leader nut 8. A pay-out spring 21, likewise of the helical compression type but more powerful than the spring 19, is arranged between the clutch washer 17 and a spring support 22, which is axially movable on the ridges 9 of the leader nut 8 and bears against the telescope sleeve 10 via a support washer 23. A thrust bearing 24 and a stop washer 25 are loosely arranged in the spring support 22 and the support washer 23 so as to permit relative rotation between the leader nut 8 with its associated parts and the stop washer 25.

An enter spring 26 of the helical compression type is arranged around the telescope sleeve 10 and between the support washer 23 and a leader ring 27. This leader ring 27 is axially movable but rotationally locked relative to the telescope sleeve 10 but has a shape at its inner periphery corresponding to the sleeve indentations 11. Hereby it is also prevented from moving further to the right than is shown in FIG. 2b. At its outer periphery it is provided with spline teeth for a purpose to be described below.

All the parts 8–27 together form a unit, as is most clearly apparent in FIGS. 6 and 7. This unit is called the leader unit.

The primary part of a second unit of the adjuster is an adjuster nut 29, which—in the same manner as the leader nut 8—is in non-self-locking engagement with the spindle 2.

Towards its left hand end as viewed in FIG. 2b the adjuster nut 29 is provided with a retaining ring 30, a pay-out washer 31, a thrust bearing 32 and a second retaining ring 33. By this arrangement the pay-out washer may cooperate with the telescope sleeve 10 in a way to be described below and rotate relative to the adjuster nut 29.

At the other side of the second retaining ring 33 there is a thrust bearing 34 and a spring sleeve 35, which hereby is rotatable on the adjuster nut 29. A take-up spring 36 of the helical compression type is arranged between this spring sleeve 35 and an adjuster ring 37.

In a way to be described below this adjuster ring 37 is held against rotation and only has a limited possibility to move axially. The ring 37 is at its inner axial surfaces provided with theeth for cooperation with corresponding toothed clutch surfaces 38 and 39 in a recess in the adjuster nut 29. As shown the distance between these clutch surfaces 38 and 39 is larger than the thickness of the ring 37. Two tooth clutches 37, 38 and 37, 39 respectively are thus formed between the adjuster nut 29 and the adjuster ring 37.

An internally splined sleeve 40, below called a spline sleeve, is only axially movable relative to the barrel 4. This is accomplished in that a driving ring 41, nonrotatably held together with the spline sleeve 40, is provided with external projections 42 cooperating with the barrel ridges 5 as appears in FIG. 3.

The spline sleeve 40 has three internal fixed retaining rings 43, 44 and 45 as counted from left to right in FIG. 2b.

The spline sleeve 40 cooperates with the leader ring 27 in a way to be described below.

An unlocking spring 46 of the helical compression type is supported by the first retaining ring 43 and bears against an unlocking sleeve 47, which in turn will apply a force to the right in FIG. 2b on the adjuster ring 37. In the rest condition the adjuster ring 37 thus bears against the second retaining ring 44. The adjuster ring 37 is at its outer periphery provided with spline teeth cooperating with the spline sleeve 40 and is thus only axially movable therein.

A pull sleeve 48 is threadingly connected to the pull rod 6 and is held against the third retaining ring 45 under operation in a way to be described below. The pull sleeve 48 has an internal clutch surface 49, which under certain circumstances forms a clutch together with a corresponding clutch surface 50 on the adjuster nut 29. This clutch, numbered 49, 50 below, may be called the main clutch.

Two clip-shaped manual adjustment springs 51 and 52, connecting the spline sleeve 40 and the pull sleeve 48, are placed axially between the second retaining ring 44 and the pull sleeve 48. These springs, better shown in FIGS. 4 and 5, have only little to do with the normal function of the adjuster and will be further described in connection with the possibility for manual adjustment of the adjuster.

All the parts 29–52 together form a unit, as is most clearly apparent in FIGS. 6 and 7. This unit is called the adjuster unit.

As already said, the spline sleeve 40 has a non-rotatable driving ring 41 at its right hand end as viewed in FIG. 2b. A barrel spring 53 of the helical compression type is arranged between this driving ring 41 and a sleeve-shaped barrel spring support 54, which may be made of a plastics material and is held in position in the barrel end by means of a lock sleeve 55 provided with a normal sealing ring 56 for the pull rod 6.

The lock sleeve 55, preferably made of a plastics material, consists of a solid ring (forming the end of the adjuster housing) and a couple of axial fingers each having a lug for cooperation with a corresponding circumferential notch in the barrel 4. After the different parts of the adjuster, and last of them the barrel spring 53 and the barrel spring support 54, have been introduced in the barrel 4, the lock sleeve 55 will be pressed into its proper position with its lugs in the barrel notch as shown in FIG. 2c. The axial force from the barrel spring 53 will be transformed into a radial, locking force on the lock sleeve 55 by means of corresponding conical surfaces on the two parts.

A corresponding but somewhat different sealing arrangement is provided at the opposite end of the barrel 4, which here is more slender and surrounds the spindle 2. In this case a lock sleeve 57, preferably made of a plastics material, consists of a solid ring surrounding the spindle 2 and a number of axial fingers each having a lug for coaction with a circumferential notch in the barrel 4. After the insertion of this sleeve 57 a sealing ring 58 and a scraper ring 59, which preferably is made of a plastics material, are inserted. In order to keep the parts in position small tabs 60 at the end of the barrel 4 are slightly bent inwardly as shown in FIG. 2a.

A notch 61 is provided in the spindle 2. When the spindle 2 is in its shown, most retracted position, this notch is at the scraper ring 59 and thus serves as an indication means.

In the barrel 4 there is an axial stop means 62 for the leader unit 8–27. It may be in the form of a retaining ring 62 in a circumferential notch in the barrel cooperating with the stop washer 25. Other stop means are also conceivable.

A guide sleeve 63 is provided between the spindle 2 and the pull rod 6 as shown in FIG. 2b.

A stop ring 64 is arranged on the spindle 2. In the shown rest position its position is close to the leader nut 8. Its purpose, however, is to prevent the spindle 2 from being pulled out of the adjuster inadvertently. If that is about to happen, the stop ring 64 hits the lock sleeve 57, and the force will be transmitted as an axial force to the left on the barrel 4 and the barrel sping 53, which thus will be compressed, as the pull sleeve 48 and pull rod 6 may be regarded as fixed. After a certain movement to the left of the spindle 2 and the barrel 4 the clutch 49, 50 to the adjuster nut 29 will be closed preventing any further movement.

FUNCTION

Normal clearance

Brake application

Reference is now being made to FIG. 2, especially FIG. 2b. As already said, the pull rod 6 and the whole adjuster moves to the right in the drawing at a brake application.

A pulling brake force is transmitted by the pull rod 6, the pull sleeve 48, the retaining ring 45, the driving ring 41, the barrel spring 53, its support 54, the lock sleeve 55, the barrel 4, the clutch ring 15, the thrust bearing 18, the clutch washer 17, the leader nut 8 and the spindle 2 (and to further not shown members of the brake rigging).

The movement of the pull rod 6 occurs relative to the pull rod head 7, which is a reference point. When the movement corresponds to the control distance A, the lock sleeve 55 reaches the pull rod head 7, which means that the barrel 4 can move no further. At the further movement to the right the pull means, comprising the pull rod 6 and the pull sleeve 48, moves under compression of the barrel spring 53. The leader nut spring 19 and the pay-out spring 21 expand, and the clutch 13, 14 is closed.

In this moment the brake blocks contact the wheel tread. The play in the clutch 13, 14 is in the order of 2 mm, which is to be added to the external adjustable control distance A and thus constitutes an internal fixed control distance for the adjuster.

When the brake block is applied to the wheel tread, further axial movement of the spindle 2 is prevented, which means that also the two nuts 8 and 29 are stopped. The force rises when the pull means 6, 48 continues to the right together with the spline sleeve 40 under further compression of the barrel spring 53. As the two nuts 8 and 29 are stationary and the spline sleeve 40 is moving, the clutch 37, 38 opens under expansion of the take-up spring 36, whereas the clutch 37, 39 closes and locks the adjuster nut 29. This means that the spline engagement between the spline sleeve 40 and the leader ring 27 is decreased from about 5 mm to about 2 mm.

From now on the force is transmitted by the adjuster nut 29. However, the main clutch 49, 50 is still not closed, so the force is transmitted via the following parts: the pull means 6, 48, the retaining ring 45, the spline sleeve 40, the retaining ring 43, the unlocking spring 46, the unlocking sleeve 47, the adjuster ring 37 and the adjuster nut 29.

When the brake force is able to compress the unlocking spring 46, the spline engagement 27, 40 ceases and the main clutch 49, 50 closes so as hereafter to transmit the brake force.

The brake blocks are applied against the wheel tread, and the brake force rises. As the brake rigging is somewhat elastic it will yield, and further relative movements occur in the mechanism.

The barrel 4 is still stationary, whereas the pull means 6, 48, the adjuster nut 29 and the spindle 2 move to the right. The whole leader unit 8-27 moves together with the spindle 2, until the stop washer 25 reaches the stop means 62. At a continued movement the whole unit 8-27 starts to rotate on the thrust bearing 24, thus registering the elastic brake application movement. As the stop washer 25 and the thrust bearing 24 are loosely arranged in the spring support 22, the rotation of the leader unit 8-27 occurs without any addition to the counter-force in the mechanism.

This continues until the brake force reaches its maximum and the brake application is completed. The position of the different parts is shown in FIG. 6.

Brake release

During the commencing part of the brake release movement or the return stroke the elasticity force from the brake rigging pulls the spindle 2 to the left in the drawing and keeps the main clutch 49, 50 closed, until the different parts reassume the positions they had when this clutch was closed for the first time.

During this elasticity part of the return stroke the whole leader unit 8-27 follows the spindle 2 a very short distance to the left, until the clutch 16 is closed. The two springs 19 and 21 are compressed, the clutch 13, 14 opens and the leader nut 8 begins to rotate on the thrust bearing 18 backwards on the spindle 2, i.e. in the direction for lengthening the adjuster. This means that the leader nut 8 sorts out the elasticity part of the brake stroke, registered during the brake application. The adjuster is thus a true clearance sensing adjuster as opposed to a so called piston stroke adjuster.

When the pay-out washer 31 hits the telescope sleeve 10, the elasticity part of the brake release stroke is ended. When the brake force becomes less than the force from the unlocking spring 46, the latter expands, the main clutch 40, 50 opens, and the leader ring 27 enters the spline sleeve 40 and locks the leader nut 8 against further rotation. The barrel spring 53 continues to expand, the clutch 37, 39 opens, and the clutch 38, 39 closes and locks the adjuster nut 29, at the same time as the engagement between the leader ring 27 and the spline sleeve 40 reaches its full length, the clutch 13, 14 opens fully, the two springs 19 and 21 are compressed and the clutch washer 17 reaches its abutment against the leader nut ridges 9, thus ending the axial movements of the two nuts 8 and 29.

All the different parts have now assumed their original positions according to FIG. 2, and the brake operation is completed.

As is apparent from the description above the leader ring 27 is axially movable on the telescope sleeve 10 and spring biased by the enter spring 26 in order to simplify its entering into the spline sleeve 40. If namely the spline teeth on the leader ring 27 hits the spline teeth in the spline sleeve 40, the leader ring will yield under compression of the enter spring 26 and turn somewhat together with the leader nut 8 so as later to enable the enter spring 26 to expand and push the leader ring 27 into the spline sleeve 40.

Excessive clearance

The description of the brake operation at excessive clearance differs somewhat depending on whether the clearance excess is less or more than 30 mm.

Brake application with clearance excess less than 30 mm

The commencement of the brake application is the same as at normal clearance according to the description above, until the pull rod head 7 reaches the lock sleeve 55, the barrel 4 stops and the clutch 13, 14 closes, as in this case the brake blocks have still not reached the wheel tread.

In this situation the spindle 2 stops for a short while together with the two nuts 8 and 29, the barrel spring 53 is compressed, the clutch 37, 38 opens and the clutch 37, 39 closes thus locking the adjuster nut 29 against rotation. At the same time the take-up spring 36 has expanded, and the splines engagement 27, 40 has decreased from about 5 to about 2 mm.

The brake force is now transmitted by the adjuster ring 37 as is earlier described. The spindle 2 reassumes its axial movement, and the leader unit 8–27 accompanies some millimeters, until the stop washer 25 reaches the stop means 62.

When the movement continues, the stop washer 25, the thrust bearing 24 and the spring support 22 must stop, which means that the pay-out spring 21 will be compressed, as the leader nut 8 follows the spindle 2 to the right without rotating, because the leader ring 27 still is in engagement about 2 mm with the spline sleeve 40.

At this stage the counter-force in the adjuster thus is the sum of the forces from the barrel spring 53 and the pay-out spring 21.

When the brake blocks reach the wheel tread the spindle 2 is stopped, and the pay-out spring 21 has been compressed a distance corresponding to the excessive clearance. The brake force increases, and when it exceeds also the force of the unlocking spring 46, the latter is compressed and the leader ring 27 is forced to leave the spline sleeve 40. The main clutch 49, 50 closes soon thereafter.

The leader nut 8 becomes free to rotate, when the leader ring 27 leaves the spline sleeve 40, and is rotationally forced to the left by the pay-out spring 21. This axial movement by the leader nut 8 on the spindle 2 corresponds to the excessive clearance.

At the following brake operation, the leader unit 8–27 will register the elasticity in the way described above in connection with normal clearance. The position of the different parts is again illustrated by FIG. 6 with the obvious difference that now the leader unit 8–27 and the adjuster unit 29–52 are further apart depending on the excessive clearance.

In this situation the counter-force comes only from the barrel spring 53.

Brake Release

During the release stroke the leader nut 8 rotates backwards as described above in connection with normal clearance. Hereby it sorts out the distance corresponding to the elastic deformation of the brake rigging. Thereafter the clutch 13, 14 is locked with a force corresponding to the sum of forces from the two springs 19 and 21.

When the elasticity force from the brake rigging has decreased, the unlocking spring 46 expands to its normal length. The barrel spring 53 pushes the spline sleeve 40, the retaining ring 44, and the adjuster ring 37 on the take-up spring 36, the thrust bearing 34, the retaining ring 33 and the adjuster nut 29. The clutch 37, 39 opens, so that the adjuster nut 29 may start to rotate on the thrust bearing 34 and remove the excessive clearance. This situation is shown in FIG. 7.

The spindle 2 is held stationary by the leader unit 8–27 during the adjustment, as the clutch 13, 14 is locked with a force which in a practical case is about three times the force of the take-up spring 36.

When the pay-out washer 31 hits the telescope sleeve 10, the rotation of the adjuster nut 29 ceases. Shortly before that the leader ring 27 has entered the telescope sleeve 40.

The brake release operation is ended in that the clutch 37, 39 opens, the take-up spring 36 is compressed, the clutch 38, 39 closes locking the adjuster nut 29, the clutch 13, 14 opens, the two nuts 8 and 29 and the spindle 2 move to the left, the two springs 19 and 21 are compressed and the clutch washer 17 reaches the leader nut ridges 9, all under the influence of the expanding barrel spring 53. All the different parts have now assumed their original positions as shown in FIG. 2, and the clearance corresponds to the control distance A.

Brake application with clearance excess more than 30 mm

The operation is the same as described above in connection with a brake application with clearance excess less than 30 mm, until the pay-out spring 21 is compressed (paragraph 4 of that description part). If as said the clearance excess is more than 30 mm, the pay-out spring 21 is compressed to its stiff length. The spindle 2 stops for a moment, while the brake force further increases and the unlocking spring 46 is compressed. The counter-force in this moment consists of the sum of the forces from the barrel spring 53 and the unlocking spring 46.

When the unlocking spring 46 has been compressed, the leader ring 27 leaves the spline sleeve 49, and the pay-out spring 21 expands, while the leader nut 8 rotates on the thrust bearing 24. The counter-force now decreases to the force from the barrel spring 53. Also the unlocking spring 46 now expands, and as the clearance excess was more than 30 mm, the movement to the right continues.

The leader unit 8–27 rotates on the thrust bearing 24, and continues to register excessive clearance. When the brake blocks contact the wheel tread, the unlocking spring 46 is compressed and the main clutch 49, 50 closes in order to transmit the brake force. The operation hereafter is as earlier described when the clearance excess was less than 30 mm.

Insufficient clearance

The adjuster works according to the so called verification principle, i.e. two brake operations are necessary for adjusting an insufficient clearance. At the first brake operation the missing clearance is only registered, whereas the proper adjustment is effected at the second brake operation.

First brake operation

As the clearance is insufficient or in other words less than the equivalence to the control distance A, the brake blocks contact the wheel tread, before the pull rod head 7 contacts the lock sleeve 55. This means that the spindle 2 and thus the two nuts 8 and 29 stop together with the barrel 4, as the latter is supported by the leader nut 8 over the clutch ring 15.

The brake force builds up, the barrel spring 53 is somewhat compressed, the clutch 37, 38 opens, and the clutch 37, 39 closes locking the adjuster nut 29, at the same time as the spline engagement between the leader ring 27 and the spline sleeve 40 decreases from 5 to 2 mm. The brake force is transmitted both over the leader nut 8 via the barrel spring 53 and the adjuster nut 29 via the unlocking spring 46.

When the brake force exceeds the combined force from the barrel spring 53 and the unlocking spring 46, these are compressed with the effect that the leader ring 27 leaves the spline sleeve 40 after a compression of about 2 mm.

The leader nut 8 is now no longer rotationally locked, so the barrel spring 63 may expand and cause the leader nut 8 to rotate for movement to the right in the drawing on the thrust bearing 18. The telescope sleeve 40 may not follow the leader nut 8 to the right, as the adjuster nut 29 and thus the pay-out washer 31 are stationary. Instead the sleeve 40 is displaced axially on the leader nut 8 under rotation on the thrust bearing 32. This means that the pay-out spring 21 has to be compressed.

This movement continues until the lock sleeve 55 reaches the pull rod head 7 but maximally 30 mm, i.e. the distance between the two nuts 8 and 29.

The position of the different parts is illustrated in FIG. 8, where the pay-out spring 21 is compressed a distance corresponding to the missing clearance.

The brake force increases, and the main clutch 49, 50 closes in order to transmit the force. When the brake rigging is deformed elastically at the brake application, the spindle 2 is pulled to the right by the adjuster nut 29. The clutch 13, 15 closes and the clutch 16 opens, whereupon the leader nut 8 rotates on the thrust bearing 32. The counterforce now is the force of the barrel spring 53.

If the clearance now is not truly insufficient but is only indicated as such, for example due to excessive friction in the brake rigging or the formation of ice on the brake blocks, the friction force will be overcome or the ice will be crushed and removed during the brake application, so that the leader nut 8 may rotate and increase its distance to the adjuster nut 29, until the pay-out spring 21 has reached its normal length, and the operation is as at normal clearance (as described above).

The condition for the further description is, however, that the clearance really is insufficient.

As earlier said the force from the brake rigging pulls the spindle 2 to the left in the drawing and keeps the main clutch 49, 50 closed in the beginning of the release or return stroke. The leader nut 8 is pulled to the left, the clutch 13, 14 slippingly opens, and the leader nut 8 may rotate on its thrust bearings and sort out the elasticity part of the brake release stroke. Hereafter the unlocking spring 46 expands together with the barrel spring 53, so that the leader ring 27 enters the spline sleeve 40 and locks the leader nut 8. The clutch 37, 39 opens and the clutch 37, 38 closes locking the adjuster nut 29. The clutch 13, 14 fully opens and the two nuts 8 and 29 together with the spindle 2 move to the left under compression of the two springs 19 and 21, until the clutch washer 17 reaches its abutment in the form of the leader nut ridges 9. The whole operation is performed under the action of the expanding barrel spring 53.

Second brake application

The pull rod head 7 contacts the lock sleeve 55, the barrel 4 stops, the pull means 6, 48 continues, the barrel spring 53 is compressed, the two springs 19 and 21 expand, the clutch 13,14 closes and the brake blocks contact the wheel tread, so that the spindle 2 stops.

The pull means 6, 48 continues and the clutch 37, 38 opens. The pay-out spring 21 however now is compressed and pushes on the adjuster nut 19 via the pay-out washer 31. Thus the adjuster nut 29 starts to rotate and follows the pull means 6, 48 to the right. The position of the different parts is illustrated in FIG. 9. This continues until the pay-out spring 21 has reassumed its original length, the adjuster has been prolonged and the clearance again is correct.

The further brake application and brake release is as described above under reference to normal clearance.

During the elasticity part of the stroke, first brake operation, the leader nut spring 19 has the function to bias the leader nut 8 to the right so that slip occurs in the clutch 13, 14. If there were no leader nut spring 19, the leader nut 8 would rest against the clutch washer 17 during the rotation, which would lead to a locking of the leader nut 8 in this position without any further compression of the pay-out spring 21. During the following application this spring 21 would expand in the initial stage with the clutch 13,14 closed, which would result in a loss in the registration of the 2 mm in the clutch 13, 14 and thus a correspondingly too small prolongation of the adjuster. The mechanism thus functions without the leader nut spring 19 but in a somewhat less satisfactory way.

Manual adjustment

Especially at the replacement of worn-out brake blocks it may be necessary manually to bring back the spindle 2 to its original position (as shown in FIG. 2). This may be accomplished through manual rotation of the barrel 4, which as appears is non-rotatable during normal operation.

As earlier described the driving ring 41 has projections 42 cooperating with the longitudinal barrel ridges 5 and is non-rotatably connected to the spline sleeve 40, which thus follows the barrel 4 at a rotation thereof. The leader nut 8 is rotationally locked to the spline sleeve 40 by the leader ring 27, whereas the adjuster nut 29 is locked thereto by the adjuster ring 37.

The two nuts 8 and 29 are thus rotated in either direction by rotation of the barrel 4. Hereby it is possible to prolong or shorten the adjuster, provided that the rotational lock between the non-rotatable pull means 6, 48 and the spline sleeve 40 is overcome as follows.

Two identical manual adjustment springs 51, 52 are arranged between the spline sleeve 40 and the pull sleeve 48. As more clearly appears in FIGS. 4 and 5, where only one spring 52 and the pull sleeve 48 are depicted, each spring 51 or 52 has spline teeth at its outer periphery cooperating with the spline sleeve 40 but also has a resilient arm ended by a projection normally (FIG. 4) engaging a notch in the pull sleeve 48. Under normal working conditions, where rotational forces on the different parts are comparatively low, the springs 51 and 52 give the desired rotational lock.

However, when it is desired to accomplish the described manual adjustment the barrel 4 may be manually rotated with a certain force, which will compel the projection of the resilient arm on each spring 51 and 52 to leave its corresponding notch as shown in FIG. 5.

The manual adjustment springs 51 and 52 thus are responsible for the prevention of unintentional rotation in the non-applied condition of the brakes under influence of shocks, vibrations and so on combined with pulling forces from the brake rigging. If in a certain installation such problems should be especially severe one or both of the springs 51, 52 may be turned around so as to increase the torque required for rotating the parts relative to each other, the torque increase being due to the altered geometrical conditions between the springs 51, 52 and the pull sleeve 48.

The barrel design

As appears from the description above several different advantages are obtained with the barrel comprised by two halves welded together along their brims and having longitudinal ridges.

The ridges 5 increase the stiffness of the barrel 4 and protect the cylindrical part of the barrel against strokes and impacts. A lower material thickness is possible, lowering the weight and price.

The ridges may be utilized for the function of the adjuster, especially at the manual adjustment.

In an adjuster of the type concerned its leader unit 8–27 must have two axial stop means in the barrel. In this case the barrel clutch 16 is one of these stop means, whereas the stop means 62 is the second one. Also this latter stop means could be in the form of an internal circumferential notch, provided that the adjuster is mounted and dismounted along the brims of the barrel 4.

A barrel must be sealed at the ends and possibly be provided with an abutment for a control rod head. Axial fixation points for such arrangements may easily be pressed into the barrel halves.

If a normal tube design should be used, different machining operations would be required. Also taking into consideration the higher weight unit price for tube than for sheet metal and the possible reduction of the material thickness, the total cost for a barrel comprised of two halves as shown and described may be considerably reduced as compared to a conventional barrel constructed with a tube as the basis.

It should be evident for a person skilled in the art that although the adjuster is shown and described as being of the pulling type, it could be altered to be of the pushing type with only relatively minor modifications. Other modifications are conceivable within the scope of the appended claims.

We claim:

1. A rail vehicle slack adjuster of the axial type, comprising an elongated barrel, a non-rotatable pull means extending out of the barrel from one of its ends, a non-rotatable spindle extending out of the barrel from its opposite end, a barrel spring of the helical compression type acting between the barrel and the pull means, and an adjuster nut in non-self-locking engagement with the spindle and capable of being clutched to the pull means, characterized in that the barrel has a lock sleeve positioned thereon, and that the spindle is provided with a stop ring carried by the spindle and axially located thereon so that at a prolongation of the adjuster the stop ring will force-transmittingly contact the lock sleeve part of the barrel with the spindle still in thread engagement in the adjuster nut.

* * * * *